(12) United States Patent
Hu et al.

(10) Patent No.: US 9,852,182 B2
(45) Date of Patent: Dec. 26, 2017

(54) DATABASE CONTROLLER, METHOD, AND PROGRAM FOR HANDLING RANGE QUERIES

(71) Applicant: FUJITSU LIMITED, Kawasaki-shi, Kanagawa (JP)

(72) Inventors: Bo Hu, Winchester (GB); Nuno Carvalho, London (GB)

(73) Assignee: FUJITSU LIMITED, Kawasaki (JP)

( * ) Notice: Subject to any disclaimer, the term of this patent is extended or adjusted under 35 U.S.C. 154(b) by 390 days.

(21) Appl. No.: 14/285,847

(22) Filed: May 23, 2014

(65) Prior Publication Data

US 2014/0358949 A1    Dec. 4, 2014

(30) Foreign Application Priority Data

May 29, 2013 (EP) ..................................... 13169786

(51) Int. Cl.
*G06F 17/30* (2006.01)

(52) U.S. Cl.
CPC .. *G06F 17/30477* (2013.01); *G06F 17/30286* (2013.01)

(58) Field of Classification Search
CPC ..................... G06F 17/30477; G06F 17/30276
See application file for complete search history.

(56) References Cited

U.S. PATENT DOCUMENTS

| 8,285,719 | B1 | 10/2012 | Long et al. |
| 8,977,622 | B1 * | 3/2015 | Dutta ................ G06F 17/30327 707/740 |
| 2009/0271359 | A1 * | 10/2009 | Bayliss ............. G06F 17/30303 706/54 |
| 2010/0106713 | A1 | 4/2010 | Esuli et al. |
| 2012/0259912 | A1 | 10/2012 | Kruse et al. |

(Continued)

FOREIGN PATENT DOCUMENTS

EP    WO 2010/120457 A2    10/2010

OTHER PUBLICATIONS

Extended European Search Report dated Nov. 27, 2013 in corresponding European Patent Application No. 13169786.4.

(Continued)

*Primary Examiner* — Polina Peach
*Assistant Examiner* — Kurt Mueller
(74) *Attorney, Agent, or Firm* — Staas & Halsey LLP

(57) ABSTRACT

A database controller for a database of data items distributed across a plurality of storage units. The database controller configured to store an ordered list comprising, for each of the data items individually, the identifying information of the storage unit upon which the data item is stored. The database controller configured to maintain a frequency record, recording the values of prefix portions of the data items and the number of data items having each prefix portion. Wherein, the ordered list and the frequency record are ordered by applying the same ordering metric to the prefix portions. The database controller being configured to receive a range query specifying a search prefix portion, to use the frequency record to calculate where to find in the ordered list the identifying information of storage units storing the data items having the search prefix, and using that identifying information to retrieve query results.

12 Claims, 3 Drawing Sheets

(56) References Cited

U.S. PATENT DOCUMENTS

| | | | | |
|---|---|---|---|---|
| 2013/0238667 A1* | 9/2013 | Carvalho | .......... | G06F 17/30958 707/798 |
| 2013/0262443 A1* | 10/2013 | Leida | ................ | G06F 17/30427 707/722 |
| 2014/0067762 A1* | 3/2014 | Carvalho | .......... | G06F 17/30958 707/636 |
| 2014/0108414 A1* | 4/2014 | Stillerman | .......... | G06F 17/3048 707/741 |

OTHER PUBLICATIONS

UK Office Action dated Dec. 19, 2014 in the corresponding Great Brittan Application No. 1409463.5.

* cited by examiner

DATABASE CONTROLLER, METHOD, AND PROGRAM FOR HANDLING RANGE QUERIES

CROSS REFERENCE TO RELATED APPLICATIONS

This application claims the benefit of European Application No. 13169786.4, filed May 29, 2013, the disclosure of which is incorporated herein by reference.

BACKGROUND

The present invention lies in the field of data storage and data mining. In particular, the invention relates to the handling of range queries submitted to a database of information encoded as a set of data items.

Distributed data stores, for example, graph databases, have been intensively investigated in the past few years. Leading technical solutions include a variety of data partition approaches and/or the data caching solutions that are tuned against particular representations. Both solutions are not ideal. Data partitioning and/or clustering is intrinsically complex and can be NP-complete in general. When using graph representation for an ontology, it is difficult to maintain data balance and minimum data replication across multiple storage units while at the same time ensuring that no knowledge is lost during the distribution process. Therefore, inter sub-graph reference happens frequently leading to a majority of the graph partition and clustering approaches failing to significantly reduce inter data-node communication. Similarly, the widely used caching algorithms are not designed for graph representation. Such problems are not restricted to graph data, and can also arise in the case of other types of distributed data storage.

There are several approaches of how to store and retrieve data from a distributed data store such as a Key Value store. One approach is to use an ordered key/value store that enables executing range queries over the keys. This approach improves the performance of Scan operations, since the system does not need to read and filter data from the entire set of servers. Another approach is to store data in a regular (i.e. not ordered) key/value store and, since the order of the keys does not need to be maintained, read operations can be optimized by co-locating data that is read together. This approach optimizes traversal operations on distributed data stores. However, due to the difficulty of maintaining an ordered data set while moving data around (co-locating) to optimize future read operations, it does not generally observe the order of keys and is expensive for scan operations.

SUMMARY

Embodiments of the present invention include a database controller for a database of information encoded as a set of data items distributed among a plurality of storage units distinguishable from one another by respective identifying information and each data item comprising a value of each of two or more data elements, the set of data items having a prescribed order of the two or more data elements of which the first one or two data elements are assigned as a prefix portion. The database controller comprises:

a query receiving module configured to receive a range query specifying a value of the or each of one or more data elements as a search prefix portion which each data item returned as a range query result must include in its prefix portion; an ordered list storage module configured to store an ordered list comprising, for each of the data items from the set of data items individually, the identifying information of the storage unit upon which the data item is stored, the order of the identifying information being determined by an ordering metric applied to the prefix portions of the respective data items; a prefix frequency storage module configured to maintain a frequency record, recording the values of the data elements assigned as prefix portions of the set of data items and the number of data items having each prefix portion; a list position calculating module configured to calculate, based on the frequency record, the one or more list positions in the ordered list at which the identifying information of storage units upon which data items including the search prefix portion in their prefix portion are stored; and a result retrieving module configured to request the data items including the search prefix portion in their prefix portion from the storage units identified in the calculated one or more list positions.

Advantageously, embodiments of the present invention enable range queries to be handled in an efficient way by establishing which storage units store data items satisfying the query before broadcasting the query to individual storage units for scanning, thereby enabling the result retrieving module to restrict the request for query results to storage units which are known to store data items satisfying the query. However, unlike known database storage systems which are optimized for handling range queries, embodiments of the present invention do not require that the data items themselves are stored in a particular order, and therefore flexibility in the distribution of data items among storage units is enabled. For example, data items can be grouped based upon their likelihood of co-occurrence in a graph traversal operation and then each group stored on a different storage unit, thus costly graph traversal operations across storage unit boundaries are reduced, but the data can still be queried efficiently. In summary, embodiments of the present invention combine ordering over the data items (by virtue of the ordered list of storage unit identifying information) which enables dynamic co-locating of data (by virtue of the data items being able to be stored in any order) and at the same time presents an ordering over the key (the prefix portion) to maximize the performance of range queries.

Embodiments of the present invention combine an ordered key-value store (prefix portions used to index storage unit identifying information) with a flexibility in data locations (there is no requirement to store the data items in order). The sorted prefix portions in the frequency record form an index for the ordered list of storage unit identifying information and enable the identifying information of storage units storing data items having a particular prefix portion to be determined.

An ordering metric is a set of rules which enable comparisons between data items or parts of data items to establish which has a higher or lower value than the other. Thus data items or parts of data items can be considered to have a value in terms of the ordering metric. The ordering metric value may be an inherent property of the data item itself. For example, if the data items are strings of alphanumeric symbols, then the ordering metric may be alphanumerical order, so that each string, or even each portion of a string, is/represents an alphanumerical value or a value of the alphanumerical ordering metric.

For example, it may be that the actual storage location of data is managed by a dynamic locator which co-locates data items which have often been accessed in the same graph traversal operations. Thus, embodiments of the present invention enable efficient range querying of the stored data without relying on the data items being stored in a particular order.

Advantageously, embodiments of the present invention provide a mechanism by which a database controller can establish which storage units store data items having a particular prefix portion (the search prefix portion) so that query results are requested only from storage units known to store data items satisfying the range query. Network traffic is reduced and processing required to perform unnecessary scans (at storage units not storing any data items satisfying the range query) is eliminated.

A data item is a piece of information or representation of information having a defined format for the database. For example, a data item includes one or more data elements, or more specifically, values of one or more data elements, wherein a data element is a defined field, type of information, component of a statement or information piece, for which a value is recorded/stored in a data item.

The identifying information could be any form of information which discriminates the storage unit to which it pertains from the remaining storage units. For example, it could be a physical address, or part of a physical address, a socket address (or a part thereof), or some other form of ID. It may be that a table or hash map or some other additional information source is required to discover the actual addressable location of the storage unit from the identifying information.

The frequency record storage module stores information that enables an index or indices to be calculated from a specified search prefix portion. The index or indices correspond to or identify the entries in the ordered list storing identifying information of the storage units storing data items having the specified search prefix portion. An exemplary embodiment of the information stored by the frequency record storage module is a prefix indexing tree/prefix search tree/prefix trie/prefix search trie/prefix indexing trie. The index or indices are a form of data mapping to or otherwise identifying a position or entry in the ordered list.

Embodiments include the database of information being a graph database and the set of data items encoding the graph database being a set of triples each comprising a value of each of three triple elements, the triple elements being exemplary of data elements.

Relational databases store data in rows and columns. The rows and columns compose tables that need to be defined before storing the data. The definition of the tables and the relationship between data contained on these tables is called a schema. A relational database uses a fixed schema. Data graphs, otherwise referred as graph databases or graph datasets, are an alternative data representation to relational databases, and provide a representation of semantic knowledge models. Graph databases represent a significant extension over relational databases by storing data in the form of nodes and arcs, where a node represents an entity or instance, and an arc represents a relationship of some type between any two nodes. In an undirected graph, an arc from node A to node B is considered to be the same as an arc from node B to node A. In a directed graph, the two directions are treated as distinct arcs.

Graph databases are used in a wide variety of different applications that can be generally categorized into two major types. The first type consists of complex knowledge-based systems that have large collections of class descriptions (referred to as "knowledge-based applications"), such as intelligent decision support and self learning. The second type includes applications that involve performing graph searches over transactional data (referred to as "transactional data applications"), such as social data and business intelligence. Many applications may represent both types. However, most applications can be characterized primarily as either knowledge-based or transactional data applications. Graph databases can be used to maintain large "semantic networks" that can store large amounts of structured and unstructured data in various fields. A semantic network is used as a form of knowledge representation and is a directed graph consisting of nodes that represent concepts, and arcs that represent semantic relationships between the concepts.

There are several approaches to encoding graph databases for storage. Graph data may be stored in memory as multidimensional arrays, or as symbols linked to other symbols. Another form of encoding is the use of "tuples", which are finite sequences or ordered lists of objects, each of a specified type. A tuple containing n objects is known as an "n-tuple," where n can be any non-negative integer greater than zero. A tuple of length 2 (a 2-tuple) is commonly called a pair, a 3-tuple is called a triple, a four-tuple is called a quadruple, and so on.

A triple consists of three triple elements (tuples) each of a specified type. The type may be specified by data within the triple itself (i.e. by storing data in a form equivalent to "type=value"), or it may be metadata known in the system to apply to the triple or set of triples to which the triple belongs. For example, each triple may belong to a set of triples which encode the graph database completely, and each set is known to be composed of triples which each store a value of three triple elements in the same (i.e. a fixed) order, so that it is known that the first value is a first type of triple element, and so on.

The term 'triple element' refers generically to a type of triple element, which may be, for example, subject, object, or predicate. Particular instances of a triple element are referred to as values of triple elements. For example, the three triple elements may be subject, object, and predicate, so that a particular triple has a value of each of subject, object, and predicate. The entity being described may be referred as the subject of the triple, the range of the identified property may be referred to as the object, and the relationship between the range and the entity may be referred to as the predicate. The triples provide for encoding of graph data by characterizing the graph data as a plurality of subject-predicate-object expressions. For example, the subject may denote a Web resource (for example, via a URI), the predicate denote a particular trait, characteristic, or aspect of the resource, and the object denote an instance, range, for example, of that trait, characteristic, or aspect. In other words, a collection of triple statements intrinsically represents directional graph data. The RDF standard defines a formalized structure for such triples, and the triples in embodiments of the present invention may be RDF triples.

Either the first one or the first two triple elements in the fixed order of the three triple elements are assigned as a prefix portion, and are used for indexing purposes in embodiments of the present invention as described in this document. Thus, the prefix portion is a label applied to particular values within each triple in a triple set.

Optionally, the prefix frequency storage module is configured to maintain the frequency record in an order determined by applying the ordering metric to the prefix portions of the data items; and the list position calculating module is configured to calculate a start point of the one or more list positions by summing the numbers of data items having prefix portions preceding the search prefix portion in the order determined by the ordering metric, and to calculate the end point of the one or more list positions by adding the number of data items having prefix portions including the search prefix portion to the start point Advantageously, the particular form of the frequency record outlined above provides a simple procedure for exploiting the information in the frequency record to locate list positions corresponding to a particular prefix portion and hence to identify storage units storing triples having that prefix portion.

As a particular implementation option, the set of data items may be duplicated one or more times, with each duplicate set storing the same database of information as the set of data items and having a different fixed order and different one or two data elements assigned as a prefix portion from that of the set of data items; the ordered list storage module is configured to store an ordered list for each duplicate set, the ordered list comprising, for each of the data items from the duplicate set of data items individually, the identifying information of the storage unit upon which the duplicate data item is stored, the order of the identifying information being determined by an ordering metric applied to the prefix portions of the respective duplicate data items; and the prefix frequency storage module is configured to maintain a frequency record for each duplicate set, recording the prefix portions of the duplicate set and the number of duplicate data items having each prefix.

Advantageously, the various set of data items and duplicate sets enable range queries with values of different data elements specified to be searched in an efficient manner. The data elements assigned as the prefix portion of a set of data items are the data elements for which values can be specified in a range query and the range query handled efficiently. Thus, the duplicate sets and corresponding ordered lists which index the duplicate sets enhance the ability of the invention embodiments to handle range queries efficiently.

As a particular example of how duplicate sets of data items may be realized, embodiments may include are one or two duplicate data item sets, the set of data items and the one or two duplicate sets have different data elements from one another in each position of the respective fixed orders of data elements. That is to say, the sets each have the same data elements, but the order in which the data elements appear in each set is different.

The particular configurations of sets of data items defined above optimize the balance between the performance benefits deriving from handling range queries efficiently versus the performance overhead of dedicating more storage space to duplicate sets and ordered lists.

In order to further tailor the operation of a database controller to multiple sets of data items, the list position calculating module may be configured to select the frequency record for one of the set of data items or the one or more duplicate sets such that the data elements of which values are recorded in the selected frequency record are the same data elements for which values are specified in the search prefix portion.

As set out above, embodiments of the present invention are configured to utilize an ordered list, frequency record, and set of data items to respond to a query in dependence upon the data elements for which values are specified in the search prefix portion. The ordered list and frequency record for the same data elements for which values are specified in the range query are leveraged to find identifying information of storage units having data items with a prefix portion matching the search prefix portion.

Optionally, the frequency record may be realized by a prefix tree, which can also be referred to as a prefix trie, a prefix search tree, or a prefix search trie. For example, the frequency storage module may be configured to store, for each of the one or more frequency records, a prefix search trie for one of the data elements of which values are recorded included in the prefix portions of the frequency record, and for each prefix search trie, a table corresponding to each leaf; the prefix search trie having a common root for all different values of the data element and a leaf corresponding to each different value of the data element appearing in the data item set or duplicate set; each leaf stores a number representing the number of data items in the set of data items set or duplicate set having the corresponding value of the data element; and the table corresponding to each leaf stores a record of values of the other data element in the prefix portion with which the value corresponding to the leaf appears, and for each value of the other data element, a co-occurrence number representing the number of data items in the set of data items or duplicate set having a prefix portion comprising the value corresponding to the leaf and the value of the other data element.

The prefix search trie is configured such that, starting from the first character and working forwards, any pair of values of data elements share a common route in the trie from the root until the pair of values differ from one another. The trie provides a mechanism for storing information, in this case, the different values of a particular data element which exist in a set of data items, in an efficient manner in terms of storage space. In addition, the trie provides a mechanism for storing and organizing information representing the number of data items in the set having each value of the data element for which the trie is formed.

Optionally, the table corresponding to each leaf may be a hash table. Hash tables provide a space-efficient mechanism for storing the table data. In detail, in a prefix search trie for a particular one of the triple elements, which is assigned as part of the prefix portion of a set of triples along with another of the triple elements, each leaf (wherein a leaf denotes/corresponds to a value of the particular one of the triple elements) stores a hash table or a link to a hash table. The keys of the hash table is at least the values of the another of the triple elements which occur in a prefix portion in the set of triples with the value of the particular one of the triple elements, and possibly all of the values of the another of the triple elements, and the value (as in key-value, not to be confused with a value of a triple element) accessed via each key is the number of prefix portions in the set of triples in which the value of the one of the triple elements denoted by the lead linking to or storing the hash table occurs with the value of the another triple element forming the key.

New information may be added to the database, so that the database controller is required to carry out certain processing operations to accommodate the new data. For example, the ordered list may be periodically updated based on information received from the storage units, and, after each update, each occupied list position in the ordered list is succeeded by a predetermined number of vacant list positions; and when a new data item is added to the set of data items or a duplicate set, adding the identifying information of the storage unit upon which the new data item is stored to a vacant list position in the respective ordered list, the vacant list position being determined by applying the ordering metric to the prefix portion of the new data item in relation to the prefix portions of the respective occupied list positions by referring to the prefix frequency storage module, such that the immediately preceding occupied list position stores the identifying information of a data item having a prefix preceding or equal to the prefix of the new data item according to the ordering metric, and the immediately following occupied list position stores the identifying information of a data item having a prefix following or equal to the prefix of the new data item according to the ordering metric.

Advantageously, the vacant list positions obviate the need to perform full updates of the ordered list every time a new triple is added to the set of triples. Of course, embodiments depend upon an order being maintained in the ordered list so that the list position calculating unit can reliably determine which list position corresponds to which prefix portion. The vacant list positions enable the order to be maintained when new triples are added, up to a certain point (the certain point being when there is no vacant list position where one is required upon addition of a new triple). Once a new entry to the list cannot be made in the correct position due to lack of vacant list positions, it may be that a full reconfiguration of the ordered list is required to create new vacant list positions. Of course, update of the ordered list to create new vacant list positions may also be performed, for example, at system idle time.

Identifying information of (or corresponding to) a data item is the identifying information of the storage unit upon which the data item is stored.

Embodiments of the invention may be implemented in a manner which enables other functional modules the freedom to distribute data without restrictions such as needing to maintain a particular order of data items. Optionally, embodiments may include those further functional modules. Embodiments may include an adaptive locator configured to control allocation of data items to storage units, and to update the allocation of data items to storage units; and an updating module configured to update the one or more ordered lists and the one or more frequency records to reflect the periodical update performed by the adaptive locator.

Advantageously, the adaptive locator provides a mechanism for allocating triples to storage units. The determination of which triples to allocate to which storage units may be based on, for example, the previous frequency of co-occurrences in graph traversal/read operations of pairs of triples, so that triples which, based on previous activity, appear likely to be accessed together, are stored together. Performance benefits result from minimizing the number of times a graph traversal operation crosses storage unit boundaries.

Many different configurations of data items and data elements are foreseeable. However, embodiments may assign the first two of three data elements as the prefix portion, and the search prefix portion in such a case may be one or two specified data elements.

Advantageously, the prefix portion being the first two of the three data elements ensures that range queries specifying values of either one or two data elements can be handled efficiently, and that the space required to store ordered lists and frequency records is not prohibitively large.

Optionally, triples are stored as strings comprising a sub string per value of triple element. String objects are quick to compare and can be manipulated (for example, divided or concatenated) according to the requirements of a processing operation. The entire triple (or indeed a prefix portion or search prefix portion) may be a single string object with whitespace used to denote the end of one value and the start of another. Each string object may include or be stored with an indication of the order of the triple elements whose values are stored in the string object. Alternatively, the order in which values appear in a triple may simply be a known property of the set of triples to which the triple belongs.

Embodiments of another aspect of the present invention include a data storage system comprising a database controller embodying the present invention, and the plurality of storage units.

The storage units may each be computing resources, for example, they may each include a storage unit, in addition to a processor, memory, and/or additional components such as a network interface card, a motherboard, input/output devices.

Such a computing apparatus may be, for example, a server. In addition to storage functionality the computing apparatus is configured to perform processing operations and to communicate with other storage units in a distributed network of storage units and/or with a centralized controller.

Embodiments may be provided in the form of a system comprising a database controller embodying the invention and a plurality of computing apparatuses embodying the invention, configured to operate as a distributed network of storage units.

In such embodiments, the plurality of computing apparatuses may be configured to operate cooperatively to form the database controller.

Embodiments of another aspect of the present invention include a method for obtaining range query results from a database of information encoded as a set of data items distributed among a plurality of storage units distinguishable from one another by respective identifying information and each data item comprising a value of each of three data elements, the set of data items having a prescribed order of the three data elements of which the first one or two data elements are assigned as a prefix portion, the plurality of storage units being connected to a database controller storing: an ordered list comprising, for each of the data items from the set of data items individually, the identifying information of the storage unit upon which the data item is stored, the order of the identifying information being determined by an ordering metric applied to the prefixes of the respective data items; and a frequency record, recording the values of the data elements assigned as prefix portions of the set of data items and the number of data items having each prefix portion. The method comprises: receiving a range query specifying a value of the or each of one or more data elements as a search prefix portion which each data item returned as a range query result must include in its prefix portion; calculating, based on a frequency record, the one or more list positions in the ordered list at which the storage unit IDs of storage units upon which data items including the search prefix portion in their prefix portion are stored; and requesting data items including the search prefix portion in their prefix portion from the storage units identified in the calculated one or more list positions.

Embodiments of another aspect of the present invention include a computer program which, when executed by one or more computing apparatuses, causes the one or more computing apparatuses to perform a method embodying the present invention.

Embodiments of another aspect of the present invention include a computer program which, when executed by one or more computing apparatuses, causes the one or more computing apparatuses to function as a database controller embodying the present invention, and/or a data storage system embodying the present invention.

Furthermore, invention embodiments may include a suite of computer programs which, when executed by a distributed network of computing apparatuses, cause the distributed network of computing apparatuses to function as a system embodying the invention.

Furthermore, embodiments of the present invention include a computer program or suite of computer programs, which, when executed by a system of computing apparatuses including a distributed network of storage units cause the system to perform a method embodying the present invention.

Although the aspects (software/methods/apparatuses) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

BRIEF DESCRIPTION OF THE DRAWINGS

Features of the present invention will now be described, purely by way of example, with reference to the accompanying drawings, in which.

DETAILED DESCRIPTION

The data storage system comprises a database controller 10 and a plurality of storage units 30.

Figure 1:
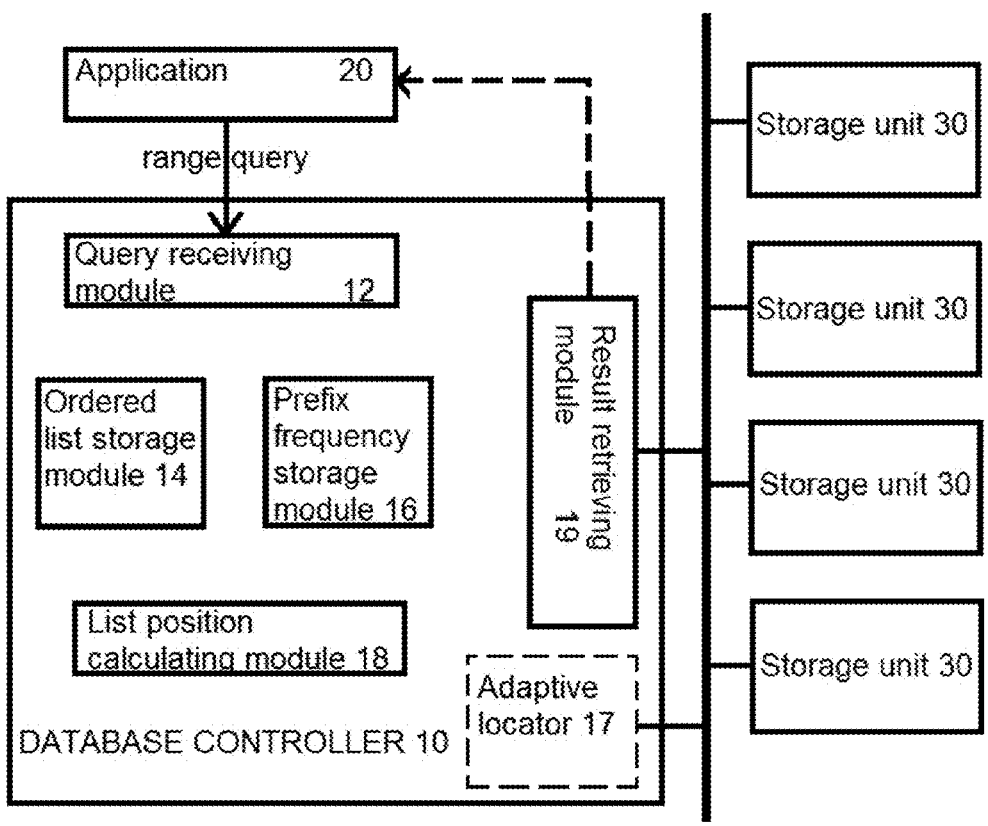
FIG. 1 illustrates a data storage system having a database controller embodying the present invention.

The plurality of storage units 30 are in data communication with one another and with the database controller via a wired or wireless network, illustrated as a bus on FIG. 1 for representative purposes. Data connections within the database controller 10 are not illustrated since it is assumed that the individual modules are configured to exchange data as and when they require in performing their functions. The application 20 may be considered as exterior or interior to the data storage system, and is significant as being the source of a range query. It may be that the application 20 is a functional layer operating within the data storage system, for example, a SPARQL query interface, which receives queries from external applications and processes them into a form suitable for forwarding to the query receiving module 12.

The database controller 10 is a functional entity which is connectable to the storage units storing the encoded database information. In the description of the particular embodiments the database of information is graph data and the data items are triples, which may specifically be RDF triples. The database controller 10 is configured to handle range queries. It may be that other entities are responsible for other database control functions, for example, insertion of new data and data updates, and handling access for applications, so that the database controller 10 embodying the present invention does not necessarily have exclusive control over the database, merely control over some functionality. The database controller 10 may be realized as a dedicated hardware device or by software running on one or more computers, which one or more computers may include servers having storage units storing the triples. The database controller may be a functional module running on a master server or some other centralized device having responsibility for controlling the storage units 30.

The database controller 10 comprises a query receiving module 12, a ordered list storage module 14, a prefix frequency storage module 16, a list position calculating module 18, and a result retrieving module 19. Optionally, the database controller may further comprise an adaptive locator 17, configured to manage the storage location of triples among the plurality of storage units 30. The adaptive locator 17 may be configured to co-locate triples which have often been accessed in the same graph traversal operations, based on acquired or observed performance statistics. For example, the adaptive locator 17 may be configured to apply a clustering algorithm to the set of triples encoding the graph database and to allocate each cluster to a different storage unit 30 among the plurality of storage units 30. The adaptive locator 17 is an optional feature as indicated by the dashed box in FIG. 1.

The actual storage location of data items is managed by the adaptive locator 17, which co-locates data items on the same server/storage unit based on an assessment of the strength of association between the data items. For example, among other possible techniques, the strength of association may be assessed by comparing semantic properties of the data items, ontological properties, or by analyzing historical data representing database read operations. Of course, more than one contributory factor may be incorporated into an association metric for measuring strength of association between data items. The more than one contributory factor may be weighted and combined in calculating an association metric score. In a particular implementation example, the adaptive locator 17 may use historical data to determine which data items have often been accessed in the same read operations and co-locate such data items on the same storage unit.

The adaptive locator 17 performs processing to allocate data items to physical locations, and the physical locations are stored in the ordered list, indexed by the prefix portion of the respective data item. Hence, the ordered list stores the results of processing performed by the adaptive locator 17. Of course, it may be that some other functional module or unit is used to manage physical locations of data items (in terms of which storage unit they are stored on).

Embodiments of the present invention afford the flexibility to employ any algorithm, system, principle, or module to allocate data items to storage units without the constraint of having to maintain the order of data items determined by the ordering metric. The only constraint is an operational one: that, once determined, the storage locations (identifying information) are stored in the ordered list. Thus, embodiments of the present invention enable efficient range querying of the stored data items without relying on the data items being stored in a particular order, because the physical locations are retrievable from the ordered list by using the prefix portion as an indexing mechanism.

The functionality of the adaptive locator 17 may be considered as having two major components. Firstly, calculating association strengths between data items, that is to say, calculating a score of an association metric representing how closely associated are a pair of data items. For example, such an association metric may be proportional to how frequently a pair of data items have been accessed as part of the same read operation. Secondly, applying an algorithm such as a clustering algorithm to use the association metric scores to decide which data items should be co-located on the same storage unit. For example, the adaptive locator 17 may be configured to select which data items from among the set of data items co-locate on the same storage unit by calculating a score of an association metric for a plurality of permutations of data item pairs and selecting the data items to co-locate in dependence upon the scores of the association metric for the plurality of permutations of data item pairs.

The association metric (or whichever process is used to assess how closely 'linked' or 'associated' two data items are) provides a mechanism to use information sources such as the historical data representing read operations performed on the database or set of data items, which may in particular specify which data items were read in each read operation. The score of the association metric between two data items represents how closely associated the two data items are, and in particular implementations based on historical data, the score of the association metric between two data items represents how closely associated the two data items have been in previous read operations.

It may be that adaptive segment locator module is configured during operation to use the same considerations to decide whether to keep a data item on its current storage unit or whether to move it to another storage unit.

The adaptive locator 17 may be configured to select upon which storage unit each data item should be stored by performing an algorithm to optimize the aggregate score of the association metric between pairs of data items which are co-located on the same storage unit.

Such an algorithm may be used to determine an optimum total score of the association metric between each pair of co-located data items in the database. Otherwise, the algorithm may be configurable to pursue other policies, for example, it may be that a new storage unit is added to the system and the adaptive locator 17 is configured to execute the algorithm to determine a predetermined number or predetermined total storage area of data items to store on the new storage unit. There are a number of different ways in which an optimum total score may be determined, and it can be appreciated in each case that an algorithm configured to pursue such an optimum may be executed by the adaptive locator 17. For example, the optimum may be the highest possible total score of the association metric between pairs of data items in the set of data items that are co-located on the same storage unit. Alternatively, it may be that there is a threshold score of association metric, and the adaptive locator 17 is configured to maximize the number of pairs of data items which have an association metric score exceeding the threshold score that are co-located on the same storage unit. For example, the algorithm may simply move the data items which will maximize the scores of the association metric between parings on the storage unit, or may take into consideration the effect of moving the data items away from their current locations so that only moves which result in a net benefit are performed. It can be appreciated that there are limitless possibilities to exploit the association metric by executing algorithms at the adaptive segment locator module 17.

Furthermore, it can be appreciated that the design of the association metric is also configurable and can be designed to suit particular implementations. For example: the historical data representing read operations performed on the database may include a record of data items which are read in the same read operations, and the score of the association metric for a pair of data items comprises a component proportional to the number of times both of the pair of data items was read in the same read operation.

The query receiving module 12 is configured to receive a range query from an application 20. It may be that the query receiving module 12 is also configured to perform parsing and other processing operations on the received range query to obtain a search prefix portion required for querying the set of triples. A range query may comprise bound and unbound values of each of the three triple elements. For example, it may be that a range query specifies a value of one or triple elements, so that that element or pair of elements is bound, and a triple must match the specified value for the bound portion of the triple in order to be included in the query results. The other triple element or elements are unbound or variable, so that any value or values of the unbound portion of a triple satisfies the query.

The list position calculating module 18 is configured to use the ordered list stored on the ordered list storage module 14 and the frequency record stored on the prefix frequency storage module 16 to obtain the identifying information of storage units among the plurality of storage units 30 storing triples having a prefix portion matching or including the search prefix portion specified in or extracted from the received range query.

The ordered list may simply comprise a series of numbers (or a list of identifying information in any form, such as physical addresses of storage units), and the ordering may not be determinable by the information stored in the ordered list, but by properties of the triples corresponding to the entries in the ordered list. Consider three triples, t1, t2, and t3 having prefix portions p1, p2, p3 respectively. It may be that the triple t1 is stored on storage unit s1, t2 on storage unit s2, and t3 on storage unit s3. The ordering metric applied to the prefix portions may be, for example, alphabetical (or alphanumerical) order of the string formed by concatenation of the values of the one or two triple elements assigned as the prefix portion. In this arbitrary example, consider the possible outcome that p2 is placed above p3 by such an ordering metric, and that p3 is in turn placed above p1. The ordered list would then read: s2, s3, s1. Hence, by applying the ordering metric to the prefix portions of the triples it is determinable which position within the list applies to each prefix portion, and hence that a triple having a particular prefix portion is retrievable from storage unit identified at the determined list position. However, the ordered list may consists of identifying information. The ordering metric is selected so that it is consistent and repeatable and may further include one or more rules for breaking ties.

Whilst the ordered list may store only the storage unit (data node) identifying information of storage units on which triples having a particular prefix portion are stored, the actual physical address of each triple may be maintained by the storage unit 30 on which they are stored.

The prefix frequency storage module 16 stores a frequency record of the different prefix portions and the number of triples in the set of triples having each prefix portion. Thus, if the same ordering metric is applied to the prefix portions in the frequency record as is applied to the prefix portions in ordering the ordered list, for a particular search prefix portion the number of entries in the ordered list corresponding to prefix portions preceding the search prefix portion in the order can be calculated by the list position calculating module 18. The frequency record may store the records in an order determined by applying the ordering metric to the prefix portion or the list position calculating module may be configured to apply an ordering metric to records retrieved from the prefix frequency storage module.

A list position can be considered to correspond to a prefix portion in the sense that the list position stores the identifying information of the storage unit from among the plurality of storage units 30 upon which a triple having the prefix portion is stored. Of course, the number of list positions corresponding to a prefix portion is equal to the number of triples having the prefix portion, and the identifying information of the storage unit storing each one of said triples is stored in the list. For example, if two triples having the same prefix portion are stored on the same storage unit then the identifying information of that storage unit will appear twice in the list positions corresponding to the prefix portion.

Once the list position calculating module has determined the list positions corresponding to prefix portions matching or including the search prefix portion, the identifying information occupying those list positions is made available (by transfer or otherwise) to the result retrieving module 19. The result retrieving module is then configured to transmit a request for the triples having the search prefix portion to the one or more identified storage units. Optionally, the result retrieving module may specify in the request the number of triples on the storage unit 30 to which the request is transmitted which have the search prefix portion. Unnecessary scanning when all results have been retrieved is thereby obviated. The result retrieving module may additionally be configured to receive the query results from the storage units, and to transmit the aggregated results to the application 20 (represented by the dashed line on FIG. 1). Alternatively, the requests sent to the storage units 30 may specify a location to which to transmit results, or a different functional module may be responsible for aggregating results and returning them to the application 20.

An exemplary technique for structuring and maintaining the frequency record(s) and ordered list(s) will be set out below, and in addition exemplary methods for leveraging the information stored therein to execute range queries will be described.

Figure 2:
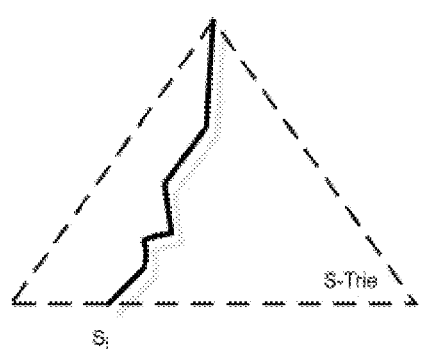
FIG. 2 illustrates a prefix tree in an invention embodiment.

As components of the frequency records, Trie, a prefix search tree, is used to construct separate indices for the values of each of the three triple elements, which three triple elements in this example shall be referred to as S (subject), P (predicate), and O (object). Three different Tries are obtained, which shall be denoted as S-Trie, P-Trie, and O-Trie. Consider a triple <Si, Pi, Oi> as an example. FIG. 2 illustrates an S-Trie with the search path routing to the index of subject Si, with 0≤i≤n where n is the total number of subjects appearing in the RDF data model (the graph database) encoded by the set of triples. In this example, subjects includes the total number of subjects of an ontology and its instances, wherein the ontology is the knowledge domain represented by the graph database. Working from the first string character forwards (and possibly with an artificially introduced common root), string objects (in this case the part of a triple string forming the subject) follow a common path in the trie until a character is reached at which the two diverge, at which point the paths diverge. Therefore, common beginnings to string objects are stored only once rather than being duplicated, and storage space is saved. A leaf of the trie corresponds to a value of the triple element, so each leaf of the S-trie is a different value of the subject triple element. At the leaves of each trie, a series of numbers are recorded or accessed and are updated when required. These numbers are used to compute the list positions corresponding to a particular prefix portion. Since the list positions have a one:one correspondence with triples in the set of triples to which the ordered lists relates, the list positions can also be considered to be triple IDs. That is to say, a triple is identifiable by the list position corresponding to the prefix portion of the triple.

An ordered list, which may be a virtual ordered list, is stored and managed for each set of triples. Each set of triples has a different formation of triple elements. For example, the data in the graph database may be encoded in triples having the form SPO, POS, and OSP for better range query performance. An ordered list is established for each different variant of formation.

The ordered list may be realized as a logic sequence such as a Key-Value (KV) map with triple IDs as keys (that is to say, list positions) and the identity or physical address (socket address) of the storage unit upon which the triple is stored as value of the KV pair. In order to increase flexibility, the triple ID is not continuous, in other words, the list positions which are occupied by storage IDs of triples in the set may be allocated so that there are gaps between occupied list positions, or at least are not continuous at the time of initiation or update. That way, triple IDs or list positions remain available for new triples. The gap between consecutive list positions may be a predefined gap to allow easy insertion when a new ID is to be added with an order between existing ones.

At each leaf vertex of a trie in the frequency record, information is recorded. The information may include:

ϵ, the total number of triples with the value of the triple element of the trie indicated by the leaf h, a table, for example a hash table, or a link to a hash table, with a certain prefix portion indexed using the concatenation of the Trie of the other triple element appearing in the prefix portion and the current Trie: the key is the leaves of the trie of the other triple element and the value is the total number of triples index by the concatenation of the triple element value indicated by the present leaf, and the triple element value represented by the leaf of the trie of the other triple element. in a prefix search trie for a particular one of the triple elements, which is assigned as part of the prefix portion of a set of triples along with another of the triple elements, each leaf (wherein a leaf denotes/corresponds to a value of the particular one of the triple elements) stores a hash table or a link to a hash table. For example, it may be that the keys of the hash table is at least the values of the another of the triple elements which occur in a prefix portion in the set of triples with the value of the particular one of the triple elements, and possibly all of the values of the another of the triple elements, and the value (as in key-value, not to be confused with a value of a triple element) accessed via each key is the number of prefix portions in the set of triples in which the value of the one of the triple elements denoted by the lead linking to or storing the hash table occurs with the value of the another triple element forming the key.

For example consider the frequency record and ordered list for a set of triples having the triple element formation OSP and assigned the prefix portion OS. The leaf of the S-Trie indicating subject string denoted Si may store the following information:

- ε of Si gives the total number of prefix portions in the set of triples having subject Si, i.e. the total number of triples in the set of triples with subject Si
- h of Si gives the total number of triples with prefix Oj Si (where 1≤j≤m where m is the number of different values of the object triple element appearing in the set of triples) i.e. the total number of triples with subject Si and each value of the object triple element and stored in OSP formation with Oj as the search key to retrieve the number of triples having a particular combination Oj Si An optional element recorded at the leaf of Si is:

- λ the total number of newly inserted triples with the value indicated by the leaf since the ordered list and frequency record were last updated This number may be utilized when normalizing the logic sequences with inserted data.

The use of a hash table may initially appear to increase the data size of leaf level storage. However, embodiments of the present invention only maintain frequency records for prefix portions of triples, and not full string prefix indexes of all formations, hence the increase in leaf level storage is more than compensated for.

The following examples indicate how frequency records and ordered lists are managed. In this example, each triple is stored in three formations, SPO, POS, and OSP. Given triples <s1 p1 o1> and <s2 p1 o1>

1. While indexing triple s1p1o1, three prefix portions are added to the frequency records, one for each formation. Each prefix portion is recorded twice—once in the value at the leaf of the Trie of one of the triple elements in the prefix portion, and once in the hash table of that leaf at the hash table value accessed by the key formed by the value of the other triple element in the prefix portion.
   a. Prefix s1 will result in the update of ε of the leaf of the S-trie indicating s1and an increase of the value accessed by the key o1 in the hash-table of s1
   b. continues to p1 with updated ε of p1 and s1-key in the hash-table
   c. continues to o1 with updated ε of o1 and p1-key in the hash-table
2. Similarly, in the indexing of s2p1o1,
   a. Prefix s2 will result in the increase of ε of s2 and increase of o1-key in the hash-table of s2
   b. continues to p1 with updated ε of p1 and s2-key in the hash-table
   c. continues to o1 with updated ε of o1 and p1-key in the hash-table In the end, s1, s2 each indexes one triple, while p1 and o1 each indexes two triples.

An exemplary technique for calculating the list position corresponding to a particular prefix portion, in other words calculating the ID of a particular triple or triple prefix portion, shall be set out below. In addition, a technique for handling a range query including the exemplary technique for calculating a list position shall be set out.

In this example, assume that a predefined gap C is left between adjacent occupied list positions (between adjacent triple IDs). The starting position of subject Si can be computed as follows:

$$\text{starting position }(S_i) = \sum_{k=0}^{i-1} \varepsilon_k^s \cdot C$$

In the above calculation, $\varepsilon_k$ is the ε recorded at the leaf indicating subject value Sk.

A range query can be formed with a wildcard character appearing at any position in a triple, replacing one or two of subject, predicate and object. As triples are duplicated in different formations, <X, *, *> or <X, Y, *>, where X and Y can be, for example, object and predicate, can be used to emulate any RDF triple range queries. Take <Si, Pj, Ok> as an example. For a normalized (see below) data storage system, the starting and ending positions of a range query are computed as follows:

For <Si, *, *>, the starting position is computed with the above equation. The ending position is computed as follows:

$$\text{ending-position}(\langle S_i, *, * \rangle) = \left(\sum_{k=0}^{i} \varepsilon_k^s \cdot C\right) - C$$

where $\varepsilon_k^s$ gives the first number recorded at leaf vertex in the subject trie (s).

For $(S_i, P_j, *)$, the starting position and ending position are computed as follows:

$$\text{starting-position}(\langle S_i, P_j, * \rangle) = \left(\sum_{k=0}^{i-1} \varepsilon_k^s \cdot C\right) + \left(\sum_{k'=0}^{j-1} h^p(S_i)_{k'}\right) - C$$

$$\text{ending-position}(\langle S_i, P_j, * \rangle) = \left(\sum_{k=0}^{i-1} \varepsilon_k^s \cdot C\right) + \left(\sum_{k'=0}^{j} h^p(S_i)_{k'}\right) - C$$

The gap C is offset to retrieve newly added data items that might have been inserted before the known starting location. Simply put, the first term in the above sums the numbers of triples having subjects appearing before the subject Si according to the ordering metric, and the second term sums the numbers of triples having prefix portions having the same subject Si and having the same predicate or predicates preceding Pj according to the ordering metric, The same computation can be applied to obtain starting and ending position of other types of range queries using different formation and different sequence of triples. The starting and ending positions of range queries are in this example computed against a normalized sequence with limited room (C-1 gaps per occupied list position) for newly added data after previous data normalization (wherein normalization occurs at update and initialization).

Once starting and ending positions are computed, a scan of the list positions within the range is carried out, retrieving all the socket addresses/storage unit identifying information of storage units storing triples having the specified prefix portion (in the above example Si Pj).

The list entry at a list position may only record a socket address (that is, the identifying information of a storage unit) pointing to the destination data server. For efficiency, when possible, range queries are divided into queries over sub-ranges by the result retrieving module, with a sub-range being the triples stored on a particular storage unit. Hence, each individual data server/storage unit storing triples having the search prefix portion (in this example Si Pj) is queried for its triples. Each storage unit may have a local indexing mechanism for retrieving requested triples. The socket addresses or other storage unit identifying information in the calculated list positions is used to identify which data nodes should be contacted and delegated to perform the parts of the range query.

When getting a particular triple, the above starting and ending points will be computed for the prefix of the particular triple based on the first two triple elements. This will return socket addresses for data nodes corresponding to all the triples within the given range. The get operation will then be broadcasted to all the data nodes to retrieve the particular triple. Data nodes do not hold the given triple will return "false", otherwise "true". GET a particular triple is effectively checking the existence of the triple in the data repository.

An exemplary procedure for managing the insertion of new data to the database is set out below. The insertion is performed as follows:

1. The data item is assigned a list position or triple ID at the median of two existing list positions respectively corresponding to prefix portions appearing before and after the prefix portion of the new triple according to the ordering metric.
2. $\epsilon$ and $\lambda$ are updated accordingly. Updating $\lambda$ is done by:
   a. obtaining the list position corresponding to the prefix portion of the newly added triple and
   b. increasing the $\lambda$ of the first subsequent list position
3. When system is at idle, the logic sequence is evened/normalized to re-establish the predefined gap between occupied list positions. For example, for the identifying information of a storage unit storing a triple having a value of a triple element indicated by a particular leaf in a Trie, this may be achieved by summing the $\lambda$ values at all leaves preceding the particular leaf according to the ordering metric (to ascertain the number of new identifying information entries which have to be accommodated in the section of the list that will affect the present list entry) and moving the list entry on by a number of list positions being equal to the summed $\lambda$ values multiplied by the predefined gap C.

The predefined gap is a variable which is configurable by a database designer or database administrator. If the gap is too small, when inserting new data one might have to shift all the data items greater than the inserted one to make room for the newly inserted data items. On the other hand, if the gap is too big, the size of Tries can become too big.

As set out above, when inserting data items, the corresponding $\lambda^\lambda$ values are updated. Using non-zero $\lambda$ values, it is also possible to identify from where the sequence should be normalized (even the gaps between data items).

Normalization or update of the ordered list may be performed periodically, when the system is at idle, or forcefully when the predefined gaps have been filled since last update. By carefully choosing the gap size, the latter situation can be largely avoided, and gaps are sufficient to last between adjacent system idle events. A heuristic rule for choosing the right gap size can be used to estimate it based on the size of the entire data-set and the history reflecting the size and rate of data insertion. The gap size should then be approximated to the maximum size of data set to be inserted in between two normalization operations. For write intensive repository, large gap should be reserved.

Figure 3:
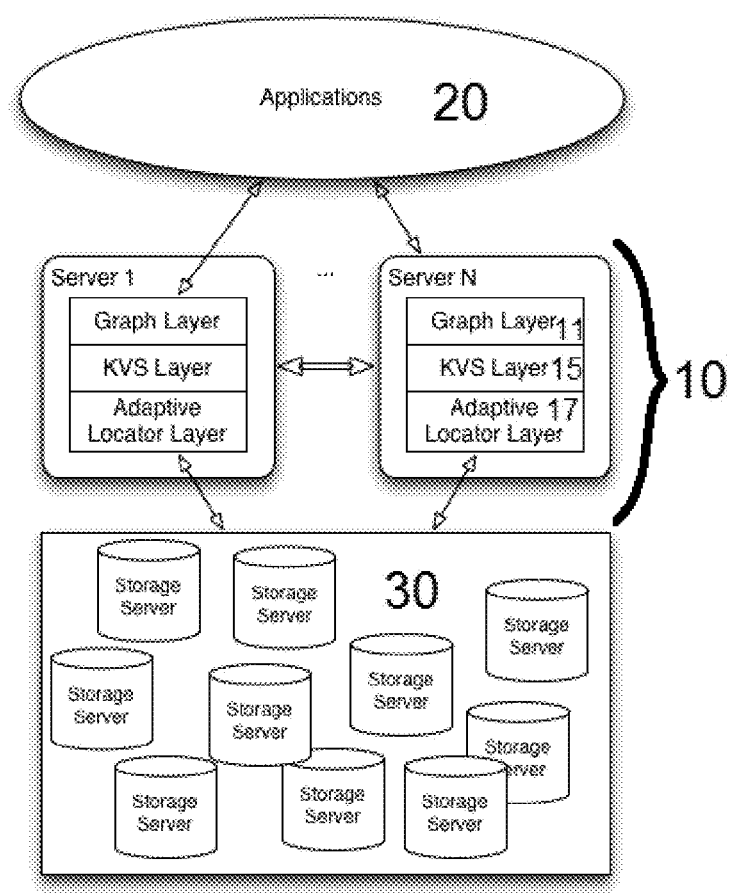
FIG. 3 illustrates an exemplary hardware configuration of an invention embodiment.

FIG. 3 illustrates an exemplary hardware configuration of a data storage system embodying the present invention. The system comprises an application tier 20, an index tier 10 which comprises a number of servers working cooperatively to realize the functionality of the database controller, and the storage tier 30, which comprises a plurality of storage units 30. At the index tier 10, multiple servers are needed to maintain the multiple Tries. Of course, this is dependent upon the size of the database and the number of different values of each triple element. Each index server contains a stack of software which provides the database controller functionality. The Graph layer 11 is exemplary of a query receiving module 12 and communicates with applications to convert queries into RDF graph transactions. The KVS layer 15 translates string objects corresponding to parts of queries into list positions/triple IDs and hence is exemplary of the ordered list storage module 14, prefix frequency storage module 16, and list position calculating module 18. The KVS Layer 15 maintains the mapping between triple ID and the storage unit identifying information allocated to triples by the Adaptive Locator Layer 17, which is exemplary of the adaptive locator. Exact data location is regulated and managed by the Adaptive Locator Layer 17. The index servers also communicate with each other through a communication network.

The number of index servers depends on mainly the size of object trie, when object can take arbitrary values apart from URIs, such as well formed URIs. It is possible that a single index tree cannot be wholly maintained by one index server. This is more likely to be the case with respect to the O-Trie since there is often more diversity in the values of objects in graph databases. The prefix tree then needs to be distributed. A simple approach to distributing a prefix tree (trie) is to adopt a hierarchical distributed structure. For instance, a tree containing the root and a limited depth down the prefix tree can be stored in a super-peer, with leaves mapping to index servers managing a sub-tree of the prefix tree.

The storage tier 30 consists of a number of data storage servers being able to maintain local data and communicate with the index layer 10, for example via the adaptive locator layer 17, and among each other through a communication network. Storage is realized using a distributed Key-value Store.

In summary, embodiments of the present invention provide:
  a system that maintains an order in the keys (the list positions) of a key/value store (in which the values are the identifying information of storage units) to improve range query operations by avoiding having to query all servers and filtering data
  a system that preserves the flexibility in data location so that data items which are frequently read together in a single operation can be co-located
  a framework that combines data co-location procedures within the ordered storage of data items to optimize both range queries and data locality.

Indexing triples based on the content of the triples themselves results in an index tree which is larger than in some other data storage techniques. A benefit lies is in the fact that the system does not unnecessarily query data storage units which do not contain query results. A further benefit is that the system retains the flexibility to co-locate co-occurrence triples on the same server to reduce network traffic. Thus, a dramatic reduction in network I/O is achieved at the cost of a modest increase in storage requirements.

The invention claimed is:

1. A database controller for a database of information encoded as a set of data items distributed among a plurality of storage units distinguishable from one another by respective identifying information and each data item comprising a value of each of two or more data elements, the set of data items having a prescribed order of the two or more data elements of which the first one or two data elements are assigned as a prefix portion, the database controller comprising computing hardware including a processor and a memory coupled to the processor and storing processing instructions which when executed by the processor cause the processor to execute a process, the process comprising:

receiving a range query specifying a value of the or each of one or more data elements as a search prefix portion which each data item returned as a range query result must include in its prefix portion;

storing an ordered list comprising, for each of the data items from the set of data items individually, the identifying information of a storage unit upon which the data item is stored, the order of the identifying information being determined by an ordering metric applied to prefix portions of the respective data items;

maintaining a frequency record, recording values of the data elements assigned as prefix portions of the set of data items and the number of data items having each prefix portion, the frequency record being maintained in an order determined by applying the ordering metric to the prefix portion of the data items;

calculating, based on the frequency record, one or more list positions in the ordered list at which the identifying information of the plurality of storage units upon which data items including the search prefix portion in their prefix portion are stored, comprising calculating a start point of the one or more list positions by summing the numbers of data items having prefix portions preceding the search prefix portion in the order determined by the ordering metric, and calculating the end point of the one or more list positions by adding the number of data items having prefix portions including the search prefix portion to the start point; and requesting the data items including the search prefix portion in their prefix portion from the plurality of storage units identified in the calculated one or more list positions, wherein the ordered list is periodically updated based on information received from the plurality of storage units, and, after each update, each occupied list position in the ordered list is succeeded by a predetermined number of vacant list positions; and the process further comprises, when a new data item is added to the set of data items or a duplicate set, adding the identifying information of a storage unit upon which the new data item is stored to a vacant list position in the respective ordered list, the vacant list position being determined by applying the ordering metric to the prefix portion of the new data item in relation to the prefix portions of the respective occupied list positions by referring to the frequency record, such that the immediately preceding occupied list position stores the identifying information of a data item having a prefix preceding or equal to the prefix of the new data item according to the ordering metric, and the immediately following occupied list position stores the identifying information of a data item having a prefix following or equal to the prefix of the new data item according to the ordering metric.

2. A database controller according to claim 1, wherein the set of data items is duplicated one or more times, with each duplicate set storing the same database of information as the set of data items and having a different fixed order and different one or two data elements assigned as a prefix portion from that of the set of data items;

the process further comprising:

storing an ordered list for each duplicate set, the ordered list comprising, for each of the data items from the duplicate set of data items individually, the identifying information of the storage unit upon which the duplicate data item is stored, the order of the identifying information being determined by an ordering metric applied to the prefix portions of the respective duplicate data items; and maintaining a frequency record for each duplicate set, recording the prefix portions of the duplicate set and the number of duplicate data items having each prefix.

3. A database controller according to claim 2, wherein there are one or two duplicate data item sets, the set of data items and the one or two duplicate sets have different data elements from one another in each position of the respective fixed orders of data elements.

4. A database controller according to claim 2, wherein the calculating the one or more list positions in the ordered list includes selecting the frequency record for one of the set of data items or the one or more duplicate sets such that the data elements of which values are recorded in the selected frequency record are the same data elements for which values are specified in the search prefix portion.

5. A database controller according to claim 1, wherein the process further includes storing, for each of the one or more frequency records, a prefix search trie for one of the data elements of which values are recorded included in the prefix portions of the frequency record, and for each prefix search trie, a table corresponding to each leaf;

the prefix search trie having a common root for all different values of the data element and a leaf corresponding to each different value of the data element appearing in the data item set or duplicate set;

each leaf stores a number representing the number of data items in the set of data items set or duplicate set having the corresponding value of the data element; and the table corresponding to each leaf stores a record of values of the other data element in the prefix portion with which the value corresponding to the leaf appears, and for each value of the other data element, a co-occurrence number representing the number of data items in the set of data items or duplicate set having a prefix portion comprising the value corresponding to the leaf and the value of the other data element.

6. A database controller according to claim 5, wherein the table corresponding to each leaf is a hash table.

7. A database controller according to claim 1, wherein the process further comprises:

controlling allocation of data items to the plurality of storage units, and updating the allocation of data items to the plurality of storage units; and updating the one or more ordered lists and the one or more frequency records to reflect the update.

8. A database controller according to claim 1, wherein the prefix portion is the first two of the three data elements, and the search prefix portion is one or two specified data elements.

9. A database controller according to claim 1, wherein the database of information is a graph database and the set of data items encoding the graph database is a set of triples each comprising a value of each of three triple elements.

10. A data storage system according to claim 1, comprising a database controller, and the plurality of storage units.

11. A method for obtaining range query results from a database of information encoded as a set of data items distributed among a plurality of storage units distinguishable from one another by respective identifying information and each data item comprising a value of each of three data elements, the set of data items having a prescribed order of the three data elements of which the first one or two data elements are assigned as a prefix portion, the plurality of storage units being connected to a database controller storing:
- an ordered list comprising, for each of the data items from the set of data items individually, the identifying information of a storage unit upon which the data item is stored, the order of the identifying information being determined by an ordering metric applied to prefixes of the respective data items; and
- a frequency record, recording values of the data elements assigned as prefix portions of the set of data items and the number of data items having each prefix portion, wherein the frequency record is in an order determined by applying the ordering metric to the prefix portions of the data items;

the method comprising:
- receiving a range query specifying a value of the or each of one or more data elements as a search prefix portion which each data item returned as a range query result must include in its prefix portion;
- calculating, based on a frequency record, the one or more list positions in the ordered list at which the storage unit IDs of the plurality of storage units upon which data items including the search prefix portion in their prefix portion are stored, comprising calculating a start point of the one or more list positions by summing the numbers of data items having prefix portions preceding the search prefix portion in the order determined by the ordering metric, and calculating the end point of the one or more list positions by adding the number of data items having prefix portions including the search prefix portion to the start point; and
- requesting data items including the search prefix portion in their prefix portion from the plurality of storage units identified in the calculated one or more list positions, wherein the ordered list is periodically updated based on information received from the plurality of storage units, and, after each update, each occupied list position in the ordered list is succeeded by a predetermined number of vacant list positions; and
- the method further comprises, when a new data item is added to the set of data items or a duplicate set, adding the identifying information of the storage unit upon which the new data item is stored to a vacant list position in the respective ordered list, the vacant list position being determined by applying the ordering metric to the prefix portion of the new data item in relation to the prefix portions of the respective occupied list positions by referring to the frequency record, such that the immediately preceding occupied list position stores the identifying information of a data item having a prefix preceding or equal to the prefix of the new data item according to the ordering metric, and the immediately following occupied list position stores the identifying information of a data item having a prefix following or equal to the prefix of the new data item according to the ordering metric.

12. A non-transitory storage medium storing a computer program which, when executed by one or more computing apparatuses, causes the one or more computing apparatuses to perform a method for obtaining range query results from a database of information encoded as a set of data items distributed among a plurality of storage units distinguishable from one another by respective identifying information and each data item comprising a value of each of three data elements, the set of data items having a prescribed order of the three data elements of which the first one or two data elements are assigned as a prefix portion, the plurality of storage units being connected to a database controller storing:
- an ordered list comprising, for each of the data items from the set of data items individually, the identifying information of the storage unit upon which the data item is stored, the order of the identifying information being determined by an ordering metric applied to the prefixes of the respective data items; and
- a frequency record, recording the values of the data elements assigned as prefix portions of the set of data items and the number of data items having each prefix portion, wherein the frequency record is in an order determined by applying the ordering metric to the prefix portions of the data items;

the method comprising:
receiving a range query specifying a value of the or each of one or more data elements as a search prefix portion which each data item returned as a range query result must include in its prefix portion;
calculating, based on a frequency record, the one or more list positions in the ordered list at which the storage unit IDs of the plurality of storage units upon which data items including the search prefix portion in their prefix portion are stored, comprising calculating a start point of the one or more list positions by summing the numbers of data items having prefix portions preceding the search prefix portion in the order determined by the ordering metric, and calculating the end point of the one or more list positions by adding the number of data items having prefix portions including the search prefix portion to the start point; and
requesting data items including the search prefix portion in their prefix portion from the plurality of storage units identified in the calculated one or more list positions, wherein the ordered list is periodically updated based on information received from the plurality of storage units, and, after each update, each occupied list position in the ordered list is succeeded by a predetermined number of vacant list positions; and
the method further comprises, when a new data item is added to the set of data items or a duplicate set, adding the identifying information of a storage unit upon which the new data item is stored to a vacant list position in the respective ordered list, the vacant list position being determined by applying the ordering metric to the prefix portion of the new data item in relation to the prefix portions of the respective occupied list positions by referring to the frequency record, such that the immediately preceding occupied list position stores the identifying information of a data item having a prefix preceding or equal to the prefix of the new data item according to the ordering metric, and the immediately following occupied list position stores the identifying information of a data item having a prefix following or equal to the prefix of the new data item according to the ordering metric.

* * * * *